United States Patent [19]
Fletcher et al.

[11] 3,712,121
[45] Jan. 23, 1973

[54] SELF-RECORDING PORTABLE SOIL PENETROMETER

[76] Inventors: James C. Fletcher, Administrator of the National Aeronautics and Space Administration with respect to an invention of; Nicholas C. Costes, 4017 Garth Road; Rolland G. Sturm, 1320 Forbes Drive, S.E.; Roland H. Norton, 2508 Lancelot Drive, S.E., all of Huntsville, Ala. 35802; George E. Campbell, P. O. Box 9, Balboa Heights, Canal Zone, Panama

[22] Filed: July 9, 1971

[21] Appl. No.: 161,028

[52] U.S. Cl. ..................................................73/84
[51] Int. Cl. .........................G01n 3/14, G01n 3/24
[58] Field of Search..........................................73/84

[56] References Cited

UNITED STATES PATENTS 2,130,751    9/1938    Van der Meer ..........................73/84
3,552,194    1/1971    Hawes .......................................73/84

FOREIGN PATENTS OR APPLICATIONS

39/23952    9/1964    Japan .......................................73/84
148,265     6/1961    U.S.S.R. ...................................73/84

*Primary Examiner*—Richard C. Queisser
*Assistant Examiner*—C. E. Snee, III
*Attorney*—L. D. Wofford, Jr. et al.

[57] ABSTRACT

A lightweight,, portable penetrometer for testing soil characteristics, which penetrometer is composed of a handle, data recording, and probe components detachably joined together. The data recording component having an easily removed recording drum which rotates according to the downward force applied on said handle and a stylus means for marking said drum along its height according to the penetration depth of said probe into the soil.

4 Claims, 15 Drawing Figures

PATENTED JAN 23 1973

DR. NICHOLAS C. COSTES
ROLAND H. NORTON
DR. ROLLAND G. STURM
GEORGE E. CAMPBELL
*INVENTORS*

BY *George D. Wofford Jr.*

ATTORNEY

DR. NICHOLA C. COSTES
ROLAND H. NORTON
DR. ROLLAND G. STURM
GEORGE E. CAMPBELL
INVENTORS

BY *Leon D. Wofford, Jr.*
ATTORNEY

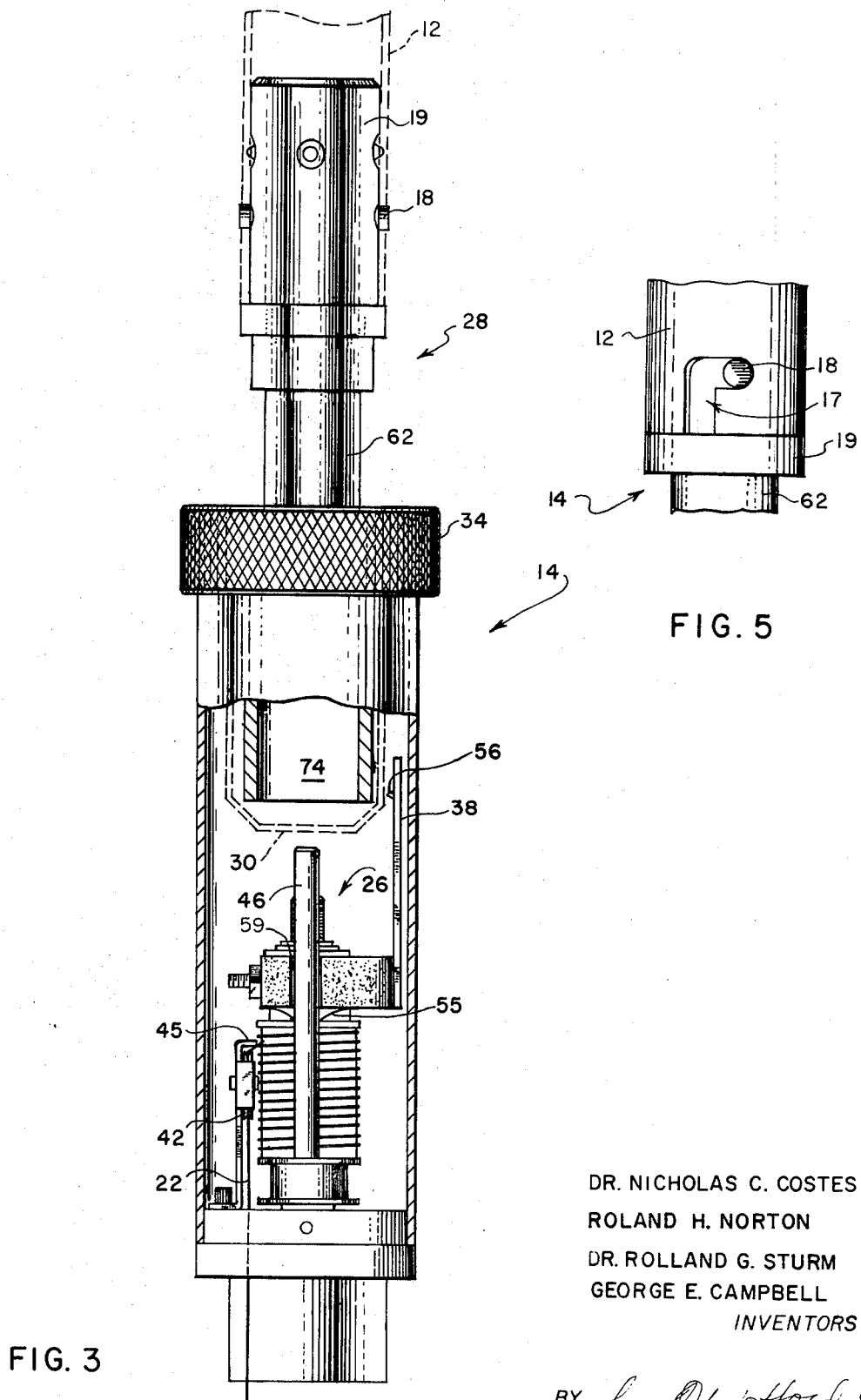

DR. NICHOLAS C. COSTES
ROLAND H. NORTON
DR. ROLLAND G. STURM
GEORGE E. CAMPBELL
INVENTORS

BY *Georg D. Wofford, Jr.*
ATTORNEY

DR. NICHOLAS C. COSTES
ROLAND H. NORTON
DR. ROLLAND G. STURM
GEORGE E. CAMPBELL
INVENTORS 3,712,121

SELF-RECORDING PORTABLE SOIL PENETROMETER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2487)

BACKGROUND OF THE INVENTION

1. Field of the Invention

The invention relates generally to penetrometers and more particularly to a lightweight, portable penetrometer designed for use on the surface of the moon.

2. Discussion of the Prior Art

There are numerous penetrometers and other soil testing implements disclosed in the art, but these devices were intended for use on earth by a person whose mobility and dexterity has not been impaired by a spacesuit. Available soil testing devices require the taking of information like penetration depth and penetration force from graduated scales that are an integral part of the penetrometer. In more refined models, a record is made on a piece of chart paper that must be replaced for each use. Most of the mechanical soil testing devices available require two operators for the performance of tests. The few available instruments that could be adapted for use on the lunar surface include electronic components having prohibitive power requirements when considered from a viewpoint of the power that will be available and the weight considerations that make it difficult to provide additional power.

It is readily apparent to one familiar with these prior art devices that their use by an astronaut on the lunar surface would be difficult and time consuming. An astronaut's time during his stay on the lunar surface is tightly scheduled due to the number of tasks that are to be accomplished during this relatively short stay. Thus, it was important that a lightweight and simple to use penetrometer be developed and applications for such a penetrometer are many, on earth and the moon. On the moon for example, force-penetration data obtained with a penetrometer in the area where lunar samples are taken will provide information that aid in classifying lunar materials and in particular in determining the implace bulk density and shear strength characteristics and stratification of lunar soil, thus, acquiring a better understanding of the origin and nature of the lunar surface.

The emphases in soils investigations during early lunar surface explorations have been directed primarily to the understanding of the nature and origin of the particulate material. Gross estimates of load-carrying capacity of the lunar surface were made early to insure that landing vehicles and walking astronauts could be supported without excessive sinkage.

The impending deployment of a lunar roving vehicle has required investigators to derive estimates of detailed load-deformation characteristics of lunar surface soils since no direct in-situ measurements were available. While significant progress has been made in ascribing mechanical strength characteristics to lunar surface soils, available data needs to be supplemented with in-situ measurements with standard instruments.

The constraints within such soil mechanics data must be collected on the lunar surface dictate that the instruments used be similar to known and generally-used standard instruments in all important geometric respects. In addition, such instruments should be fast and easy to deploy and operate, highly portable and wholly self-contained. At the same time, they must have all those design and operational features required to produce accurate data consistent with those produced by similar earth-bound instrumentation.

Accordingly, it is an object of the present invention to provide a lightweight penetrometer capable of making repeated lunar soil force-penetration tests and making a permanent record of a number of such tests.

A further object is to provide a penetrometer that can be disassembled and folded for compact storage while in transit to its point of use.

Other and further objects, uses, and advantages of the present invention will become apparent as the description proceeds.

SUMMARY OF THE INVENTION

The penetrometer of the present invention provides an instrument that will satisfy the greatest number of data use requirements and is capable of producing continuous simultaneous force and penetration depth records.

The penetrometer is essentially composed of a handle component, a data recording component, and a probe component that may be easily assembled and disassembled together. The handle connects to the upper end of the data recording unit, and the probe connects to the lower end thereof. The data recording component has a metal recording drum on which a stylus scribes a permanent record. A pad assembly is slidably mounted on the probe to serve as a reference plane by resting against the soil surface before the probe is forced into the soil. The pad assembly is connected by a cable to the data recording component so that movement of the pad assembly relative to the probe as it enters the soil will actuate the scribe to indicate the depth of penetration. Also, the data recording component includes a mechanism to rotate the drum proportionately to the amount of force exerted on the handle to cause penetration of the probe into the soil. The independent motions of the drum and stylus combined to produce a continuous force-penetration diagram on the surface of the recording drum.

BRIEF DESCRIPTION OF THE DRAWINGS

FIG. 3 is a partial sectional view of the data recording component at a different position than FIG. 2.

FIG. 5 is an enlarged view of the junction between the handle and data recording component.

DETAILED DESCRIPTION OF THE DRAWINGS

Figure 1:
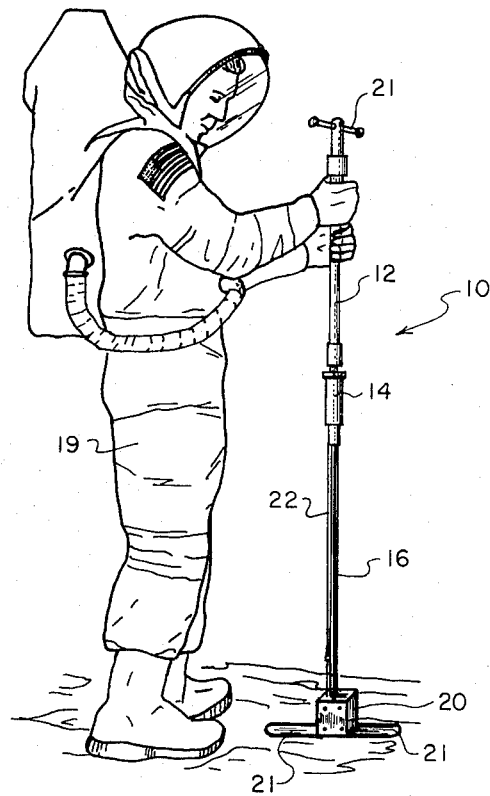
FIG. 1 illustrates the penetrometer of the present invention in use.

Referring now to FIG. 1 wherein is shown an astronaut 19 forcing a penetrometer 10 of the present invention into the lunar soil. The penetrometer 10 consists essentially of a handle component 12, a data recording component 14, and a probe component 22 detachably joined together.

The handle component 12 is an elongated cylindrical shaft with an upper cross bar 21 extending through a hole at its top end to enable the astronaut to grasp the penetrometer 10 and apply downward or upward force easily. The lower end of the handle component has a socket recess for the reception of the upper or cap end 19 of the data recording component 14, as shown best in FIGS. 2 and 4.

Figure 4:
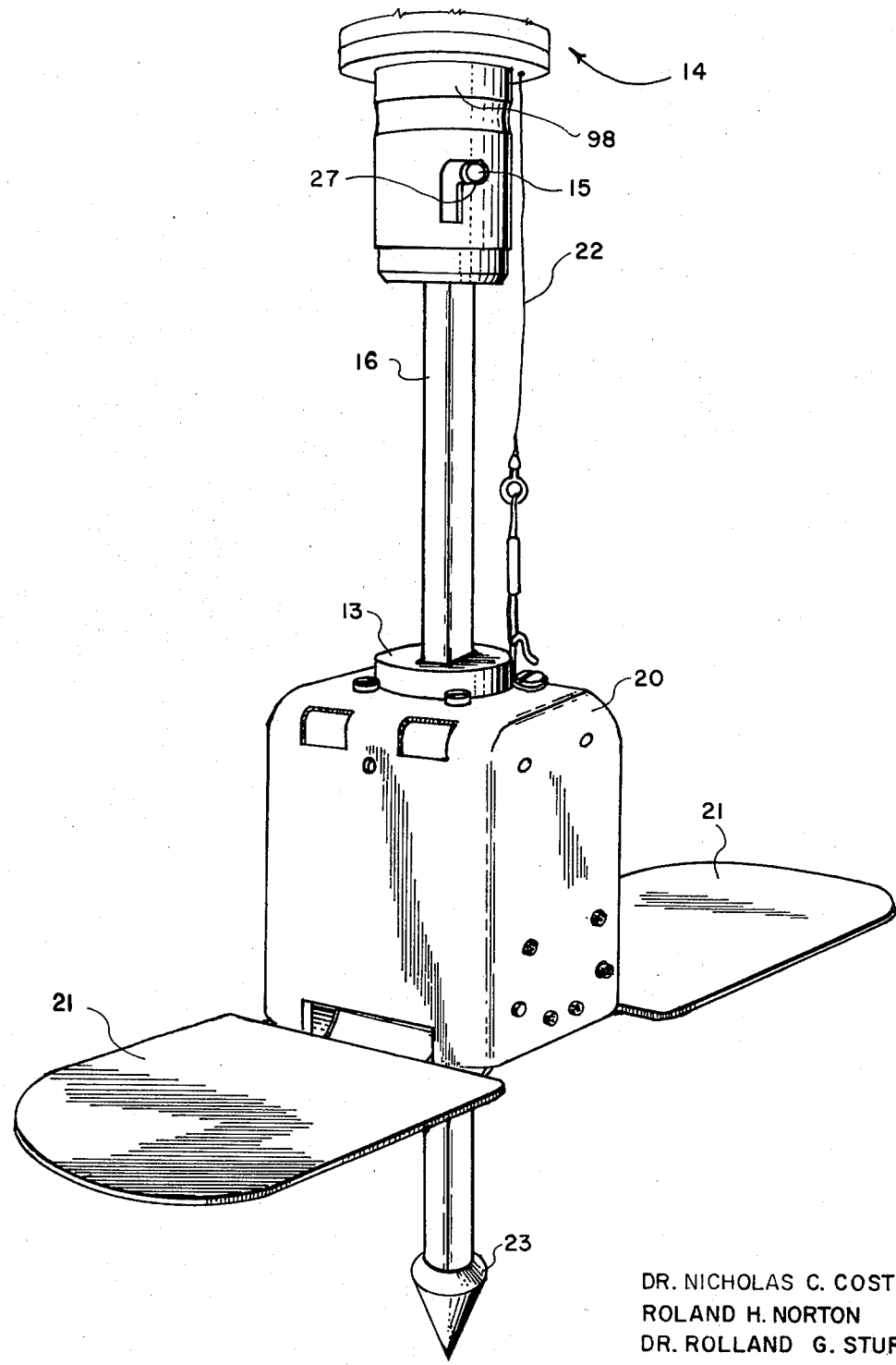
FIG. 4 is an enlarged view of the lower end of the penetrometer.

As shown in FIG. 4, socket recess of the handle has at least two inverted L-shaped slots 17 extending through its side walls for reception of bayonet pins 18 (also see FIG. 2) that extend outward from the upper shaft end 19 of the recording component 14 so that by relative rotation of the two they can be fastened together.

The probe component 16 is an elongated square shaft with a removable pointed tip 23 threaded on its lower end. The shaft of the probe 16 at its upper end is also provided with projecting bayonet pins 15 for reception by the inverted L-shaped slots 27 formed in the side wall recess socket at the lower end of the recording component 14 so by relative rotation they also can be fastened together, as shown best in FIGS. 2 and 5.

A surface pad assembly 20 is slidably mounted on the probe shaft 16 and has a cable 22 fastened thereto (see FIG. 4) which is associated with the recording component 14 in a manner more completely described hereinafter. The pad assembly 20 consists of a box having a center Teflon bushing 13 which has a squared opening through which the probe shaft 16 extends. A pair of foldable flaps 21 are hinged to opposite sides of the box for increasing the soil surface bearing area when in operating position.

The handle component 12 is the Apollo Lunar Hand Tool Extension handle that is adapted to perform various tasks.

Figure 2:
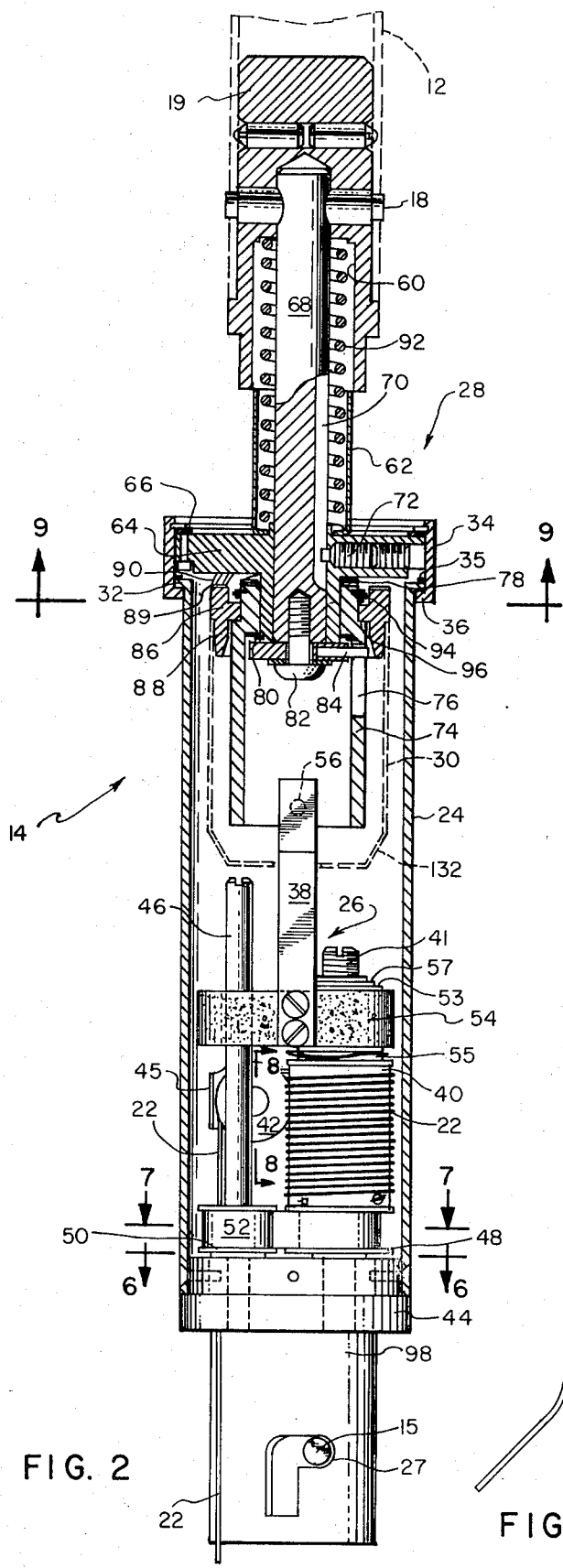
FIG. 2 is a sectional view of the data recording component of the penetrometer.

The data recording unit 14 shown in cross-section in FIG. 2 is composed of two separable parts; a housing 24 in which a stylus assembly 26 is mounted, and a plunger indexing assembly 28 on which a recording metal cylinder 30 (shown in phantom), is mounted. Housing 24 has an interrupted, outwardly extending flange 32 formed on the upper end thereof that fits into a casing 34 that forms a part of plunger assembly 28. Casing 34 has an inwardly projecting interrupted flange 36 that is arranged to permit insertion of interrupted flange 32 into casing 34. Relative rotation between casing 34 and housing 24 will cause the flanges to align so that housing 24 cannot be withdrawn from casing 34. Shoulders 35 that project inwardly from casing 34 engage flange 32 to provide a tight friction fit between the two separable parts of the data recording unit. When housing 24 is assembled to plunger assembly 28, stylus arm 38 of assembly 26 contacts recording drum 30 so as to scribe a mark thereon. As will be more fully described hereafter in reference to FIG. 10 a mark is scribed on the drum when the drum is rotated by the plunger assembly 28 and by movement of stylus arm 38 along drum 30.

Figure 8:
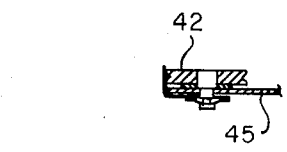
FIG. 8 is a sectional view taken along line 8—8 of FIG. 2.
Figure 7:
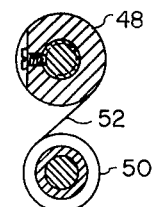
FIG. 7 is a plan view of the spool and spring relationship.
Figure 6:
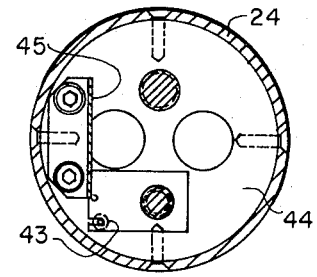
FIG. 6 is a sectional view taken along line 6—6 of FIG. 2.

Stylus assembly 26 comprises a cable take-up spool 40 rotatably mounted on a threaded shaft 41 so as to move up and down the shaft when rotated. A cable 22 wound on spool 40 passes over pulley 42 and through a Teflon bushing 43 (FIG. 6) in base 44 to where it connects to surface pad assembly 20. Pulley 42 is mounted in a bracket 45 that is fastened to base 44 (see FIGS. 2 and 8). A rod 46 is mounted in base 44 in a position adjacent spool 40. Spool 40 and rod 46 have spring take-up drums 48 and 50 mounted thereon in a position adjacent base 44. The spring take-up drums rotate on rod 46 and with spool 40 and move vertically with the spool. A constant torque, coil spring 52 is wound around both spring take-up spools so that winding additional turns of spring on one spool will necessarily result in unwinding of the spring from the other spool (see FIG. 7). Spool 40 and drum 48 turns when cable 22 is unwound by moving pad assembly 20 to the extreme lower end of the probe. This loads the spring and when cable tension is released by movement of the pad assembly up the probe the spring will cause drum 48 and spool 40 to turn, rewinding cable 22 on spool 40 and turning spool 40 down shaft 41.

A stylus arm support member 54 is mounted on upper end portion 53 of spool 40 for movement therewith. Member 54 is secured in position by belville washer 55 and retaining ring 57. Stylus arm 38, composed of spring material, is bolted to support member 54 for movement therewith and includes a scribing point 56 that bears against the recording drum 30 to scribe a mark thereon when moved relative thereto. Stylus arm support member 54 has a groove 59 in one side thereof (see FIG. 3) that accommodates rod 46 which serves as a guide during axial movement of the stylus assembly to avoid lateral movement of the stylus arm. When the pad assembly 20 (FIG. 4) is positioned at the extreme end of the probe 16, cable 22 is unwound from spool 40 and the spool rotates up threaded shaft 41. When the probe is pushed into the soil being tested the pad assembly 20 slides up the probe, releasing the tension cable 22 and allowing spring 52 to rotate spool 40 so as to rewind the cable and move the spool and stylus assembly axially downwardly, this results in movement of the stylus arm with respect to the recording drum and scribing a mark 137 thereon (see FIG. 10) the length and armature of the mark being proportional to the penetration depth of the probe and the force applied thereto.

As the astronaut applies pressure to the penetrometer to drive the probe into the soil being tested, the plunger assembly 28 (see FIG. 2) will be actuated to rotate the recording drum relative to stylus assembly 26. The plunger assembly includes cap member 19 to which handle 12 mounts. Cap member 19 has a central bore 60 that is arranged to receive a cylindrical spring cover 62 when the plunger assembly is actuated. Cover 62 is mounted to an annular collar or cover member 64 secured in casing 34 by suitable retainer rings 66. A shaft 68 having a straight slot 70 extending along a substantial portion of its length is fixed in cap 19 and slidably mounted through collar 64. A set screw 72 mounted in collar 64 extends into slot 70 and prevents relative rotation between most of the components of the plunger assembly and the stylus assembly. Collar 64 has a carrier cylinder 74 mounted thereon and cylinder 74 has an angled slot 76 formed in the wall thereof (see FIG. 11). Cylinder 74 is rotatably mounted on the collar and is held in position by a suitable spring washer 78 and retaining ring 80. Shaft 68 is held in collar 64 by cap screw 82 that screws into the lower end thereof. The washer between capscrew 82 and shaft 68 has a pin 84 mounted therein that extends into slanted slot 76 so as to rotate cylinder 74 relative to collar 64 when the shaft is moved downward by the application of force thereto.

Figure 9:
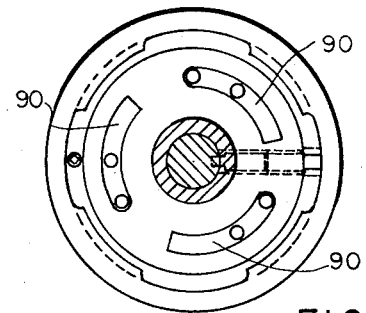
FIG. 9 is a sectional view taken along line 9—9 of FIG. 2.
Figure 12:
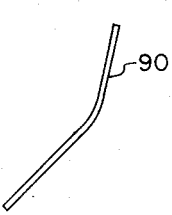
FIG. 12 illustrates a spring shape.

A carrier ring 86 for the recording drum 30 is mounted around the periphery of the upper end of slotted cylinder 74. The carrier ring includes a downwardly extending skirt portion 88 that is sized so as to receive recording drum 30 with a friction fit. The upper end of the carrier ring has teeth 89 formed thereon that are engaged by ratchet springs 90 mounted on the lower surface of collar 64 and extending downwardly so as to engage teeth 89. There are three such springs 90 mounted on collar 64, as is apparent from a consideration of FIGS. 9; the shape of the spring is shown in FIG. 12.

The springs 90 function to permit rotation of carrier member 86 in one direction with cylinder 74, but when cylinder 74 is rotated in the reverse direction, by movement of pin 84 up slanted slot 76, the springs 90 hold the carrier ring against rotation by engaging teeth 89. A coil spring 92 is positioned within bore 60 and spring cover 62 to normally bias cap member 19 away from the collar 64. Each time the astronaut applies a force to the plunger assembly the coil spring 92 will be compressed and as soon as the force is released the cap member 19 and shaft 68 connected thereto will be biased upwardly by the action of compressed spring 92. As is apparent, up and down movement of cap member 19 and shaft 68 will result in cylinder 74 being rotated first in one direction on the downward stroke and then back on the upward stroke. Carrier ring 86, and thus the recording drum, moves along with slotted cylinder 74 on the downward stroke, but on the upward stroke carrier 86 is held against rotation by springs 90 and cylinder 74 rotates in carrier 86. Spring washers 94 and shoulder 96 provide a desired amount of friction between cylinder 74 and carrier 86 to achieve the desired axial alignment of moving parts. Since the stylus arm 38 contacts the recording drum a mark will be scribed thereon when the recording drum is rotated. Base member 44 which closes one end of housing 24 has a short cylindrical casing 98 extending therefrom that has the slot 17 formed therein.

Figures 10, 11:
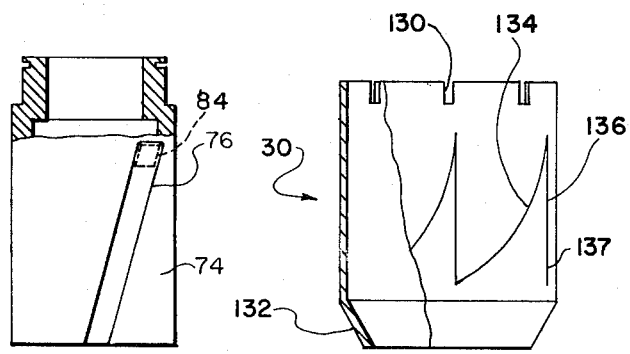
FIG. 10 is a view of the recording drum showing the recording curved marks.
FIG. 11 is a view of the cylinder used to rotate the recording drum.

As indicated by FIG. 10, the recording drum 30 is composed of relatively thin material and the upper end thereof is slotted, as at 130 to premit some expansion of the upper end as it is fitted onto skirt 88 (see FIG. 2) of the recording drum carrier 86; thus assuring a light friction fit, but allowing easy removal thereof. The lower end 132 of the recording drum is beveled, so as to prevent damage to the stylus 38 when fitting together plunger assembly 28 with housing assembly 24 and stylus assembly 26.

In the present embodiment, stylus 38 is provided with a point 56 which will inscribe a line in the soft metal of the recording drum 30. The drum may be gold plated to assure that corrosion does not obliterate any of the probe force-penetration traces scribed on the surface of the recording drum 30.

Typical force-penetration traces 137, or they could be called pressure-sinkage lines, are shown in FIG. 10. The curved portions of the trace, designated by numeral 134 is made when the user forces the penetrometer probe into the soil being tested. The vertical component 136 of the curve represents the penetration depth of the probe and the horizontal component the amount of force required to achieve a particular penetration. Vertical line 136 is scribed when the surface pad assembly 20 is returned to its lowest position ready for the next test. The details of how the recording drum is rotated or ratched in only one direction, and the stylus arm moved, will not be described again here since it was discussed above in the description of the mechanism. EAch use of the penetrometer will result in a trace and the width of the trace, that is its peripheral length around the surface of the recording drum, will be a direct indication of the force required to sink the probe.

Typical dimensions of the penetrometer disclosed herein is as follows, overall length withouth the handle is 109 cm (43 in.), of which the recording unit comprises 23 cm (9 in.). The recording unit is 8.9 cm (3.5 in.) in diameter. The deployed surface reference pad is 38 cm (15 in.) long and 7.6 cm (3 in.) wide. Total weight of the unit is 2.3 kg (5 lb.) maximum including penetrometer tips.

Figure 13:
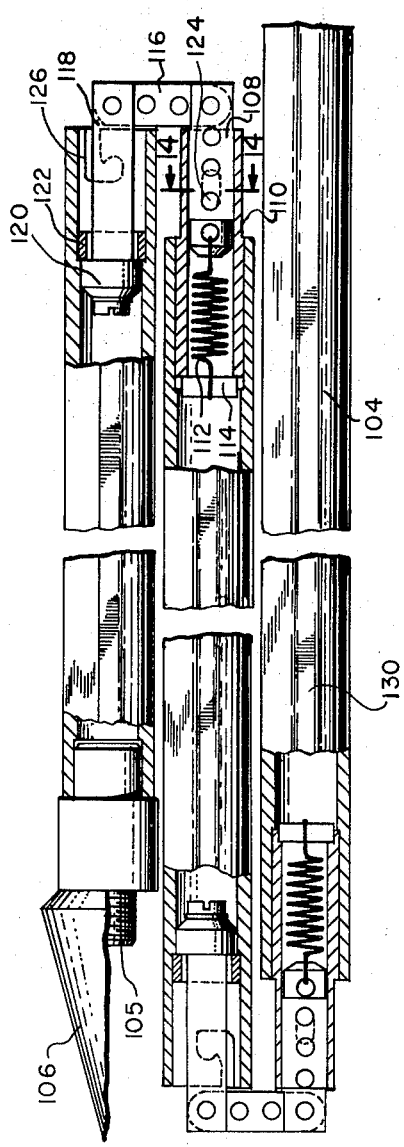
FIG. 13 is a partial view of a modified probe shaft in its folded position.
Figure 14:
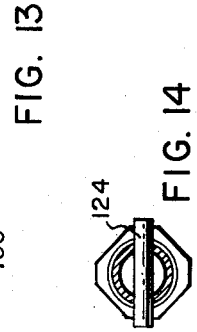
FIG. 14 is a view along line 13—13 of FIG. 12.
Figure 15:
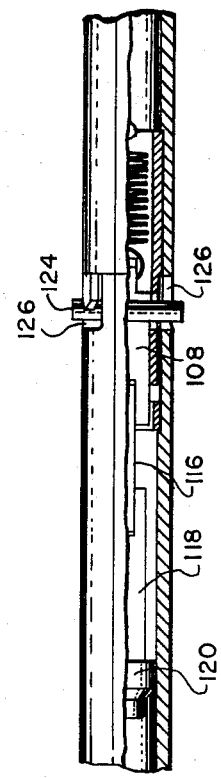
FIG. 15 illustrates the folded probe shaft of FIG. 12 in its extended position.

An alternate embodiment of the probe shaft is illustrated in FIG. 13. The modified probe consists primarily of tubular shaft member 104 which has a plurality of joints formed therein, and a lower end 105 which is threaded to receive a point 106 of any suitable size or configuration. A joint in locked position is illustrated in FIG. 15, and FIG. 14 is a sectional view of the joint taken along line 7—7 of FIG. 13. The joint consists of a first link 108 that is slidably mounted in sleeve 110 which is fixed in tubular member 104. A spring 112 is fastened at one end to pin 114 and the other end is fastened to link 108. A second link 116 is pivotally mounted to link 108 and to a third link 118. Link 118 is secured in tubular member 104 by means of a bushing 120 which abuts a sleeve 122 secured to the interior surface of the tubular member. Link 118 is slidably disposed in sleeve 122 so that when the probe is extended bushing 120 can slide towards the lower end of the probe. A pin 124 mounted through link 108 and sleeve 110 fits into a slot 126 formed in the wall of tubular member 104 when each joint of the probe is assembled in a locked and extended position. Locking in the extended position is accomplished by rotating adjacent segments of member 104 causing pin 124 to engage in the detent portion of slot 126. How the pin fits into slot 126 in its locked position illustrated in FIG. 15. It is believed apparent how the hinged joint functions from the foregoing description and while only one joint has been described it is apparent that each joint is identical and would function in the same manner. The probe is straightened from a folded position merely by unfolding. As each joint is unfolded the action of spring 112 will cause the various links to retract into the tubular member which holds them in a straightened position. Pin 124 fits into slot 126 and remains there until positive removal by an astronaut when storing the penetrometer after use.

The shaft 104 has diametrically opposed flats 130 formed thereon whereby the bushing the surface pad assembly 20 can be correspondingly mated to prevent the shaft from turning. Also, the upper end of the shaft can be modified to have a square shape with pins similar to probe 16 so as to fit the existing lower recess socket of the data recording component, or the socket recess may be modified to fit the new shaped probe shaft 104.

It should now be apparent that there are many modifications that may be made to the penetrometer. For example, the present recording drum is such that only 12 recordings can be made. By increasing the diameter of the recording drum more recordings per recording drum could be obtained. Further, the penetrometer could be provided with a counting mechanism that is activated with each use so as to count and display the number of uses.

What is claimed is:

1. A penetrometer for making a record of the force required to cause a probe to penetrate the soil, comprising:
    a handle component;
    a plunger shaft secured at its upper end to said handle component;
    a housing with an internal chamber;
    said plunger shaft having its lower portion extending into said housing chamber, and said plunger shaft and housing adapted to slide relative to each other along a main vertical axis;
    limiting means for providing upper and lower stops to the relative vertical movement of the housing and plunger shaft;
    spring means encircling the upper portion of said plunger shaft and extending between said housing and said handle component for causing them to be biased apart and for causing said plunger shaft to normally extend from said housing to its maximum extent;
    a carrier ring rotatably mounted to the upper portion of said housing and encircling said plunger shaft extending within said housing chamber;
    a recording cylinder within said housing chamber and fitted at its upper end to said carrier ring so said recording cylinder will rotate about its vertical axis when said carrier ring is caused to rotate;
    means or causing said recording cylinder and carrier ring to rotate proportional to the vertical downward movement of said plunger shaft within said housing chamber;
    a support member having a scribing point bearing against the outer cylindrical surface of said recording cylinder;
    activating means adapted to cause said support member to move vertically upward or downward within said housing chamber;
    an elongated probe secured at its upper end to the lower part of said housing;
    said elongated probe having a pad assembly slidably mounted thereon, said pad assembly adapted to rest on the upper surface of the soil as said elongated probe penetrates the soil; and
    a cable connecting said pad assembly and said activating means to move said support member and its scribing point vertically upward or downward proportional to the vertically upward or downward movement of said pad assembly relative to said elongated probe.

2. A penetrometer according to claim 1 wherein:
    said activating means includes a spool for winding the upper portion of said cable thereon or therefrom;
    a spring means for causing said spool to rotate and wind a portion of said cable thereon when cable tension is released by upward movement of said pad assembly.

3. A penetrometer according to claim 1 wherein said means for causing said recording cylinder and carrier ring to rotate includes:
    a ratchet means on said carrier ring and said housing to permit said carrier ring to rotate only in one direction;
    a cylindrical carrier member rotatably mounted to the upper portion of said housing and frictionally engaging the inner circumferential surface of said carrier ring;
    said carrier member having a slanted slot within its cylindrical side wall;
    said plunger shaft having at its lower end a pin extending into said slot whereby vertical downward movement of the plunger shaft will cause rotation of said carrier member and thereby the rotation of said carrier ring which carries said recording cylinder, and vertical upward movement of said plunger shaft will cause rotation of said carrier member in the opposite direction while said ratchet means prevents rotation of said carrier ring which carries said recording cylinder.

4. A penetrometer according to claim 1 wherein said elongated probe has a plurality of joints which enables the probe to be folded for easy storing.

* * * * *